United States Patent [19]

Land et al.

[11] 4,186,015

[45] Jan. 29, 1980

[54] SILVER DIFFUSION TRANSFER RECEIVING LAYER COMPRISING GELATIN AND POLYVINYL ALCOHOL

[75] Inventors: Edwin H. Land, Cambridge; Stanley M. Bloom, Waban, both of Mass.

[73] Assignee: Polaroid Corporation, Cambridge, Mass.

[21] Appl. No.: 897,942

[22] Filed: Apr. 4, 1978

[51] Int. Cl.$^2$ .......................... G03C 1/48; B44D 1/09; C03C 17/06; C03C 21/00

[52] U.S. Cl. .................................... 430/231; 428/457; 428/500; 430/245; 430/247

[58] Field of Search ........................... 96/76 R, 119 R; 428/457, 539, 500

[56] References Cited

U.S. PATENT DOCUMENTS

| | | | |
|---|---|---|---|
| 2,543,181 | 2/1951 | Land | 96/76 R |
| 2,726,154 | 12/1955 | Land | 96/76 R |
| 2,861,885 | 11/1958 | Land | 96/76 R |
| 2,944,894 | 7/1960 | Land | 96/76 R |
| 3,536,488 | 10/1970 | Land | 96/76 R |
| 3,615,426 | 10/1971 | Debruyn | 96/76 R |
| 3,615,427 | 10/1971 | Debruyn | 96/76 R |
| 3,615,428 | 10/1971 | Weed | 96/76 R |
| 3,615,429 | 10/1971 | Weed | 96/76 R |
| 3,647,440 | 3/1972 | Rasch | 96/76 R |
| 3,753,764 | 11/1970 | Haefner | 96/76 R |
| 3,894,871 | 7/1975 | Land | 96/76 R |

OTHER PUBLICATIONS

Land, *One Step Photography* Photographic Journal, Section A, 1950, pp. 7-15.

*Primary Examiner*—Richard L. Schilling
*Attorney, Agent, or Firm*—Philip G. Kiely

[57] ABSTRACT

A receiving element for use in a photographic silver diffusion transfer process which comprises a transparent support carrying a layer comprising gelatin, polyvinyl alcohol and noble metal silver-precipitating nuclei; wherein said nuclei are present in a level of from about 0.1-0.4 mgs/ft$^2$, gelatin is present at a level of from about 0.05 to 1.5 mgs/ft$^2$ and polyvinyl alcohol is present at a level of about 0.1 to 5 mgs/ft$^2$. Preferably, the noble metal is palladium. The receiving element is particularly useful in an additive color diffusion transfer process.

12 Claims, No Drawings

SILVER DIFFUSION TRANSFER RECEIVING LAYER COMPRISING GELATIN AND POLYVINYL ALCOHOL

BACKGROUND OF THE INVENTION

Procedures for preparing photographic images in silver by diffusion transfer principles are well known in the art. For the formation of the positive silver images, a latent image contained in an exposed photosensitive silver halide emulsion is developed and almost concurrently therewith, a soluble silver complex is obtained by reaction of a silver halide solvent with the unexposed and undeveloped silver halide of said emulsion. Preferably, the photosensitive silver halide emulsion is developed with a processing composition in a viscous condition which is spread between the photosensitive element comprising the silver halide emulsion and a print-receiving element comprising, preferably, a suitable silver-precipitating layer. The processing composition effects development of the latent image in the emulsion and, substantially contemporaneously therewith, forms a soluble silver complex, for example, a thiosulfate or thiocyanate, with undeveloped silver halide. This soluble silver complex is, at least in part, transported in the direction of the print-receiving element and the silver thereof is largely precipitated in the silver-precipitating element to form a positive image thereon. Procedures of this description are disclosed, for example, in U.S. Pat. No. 2,543,181 issued to Edwin H. Land, See, also, Edwin H. Land, *One Step Photography,* Photographic Journal, Section A, pp. 7–15, Jan. 1950.

Additive color reproduction may be produced by exposing a photosensitive silver halide emulsion through an additive color screen having filter media or screen elements each of an individual additive color, such as red or green or blue, and by viewing the reversed or positive silver image formed by transfer to a transparent print-receiving element through the same or a similar screen which is suitably registered with the reversed positive image carried by the print-receiving layer.

As examples of suitable film structures for employment in additive color photography, mention may be made of U.S. Pat. Nos. 2,861,885; 2,726,154; 2,944,894; 3,536,488; 3,615,427; 3,615,423; 3,615,429; 3,615,426; and 3,894,871.

The image-receiving elements of the present invention are particularly suited for use in diffusion transfer film units wherein there is contained a positive transfer image and a negative silver image, the two images being in separate layers on a common, transparent support and viewed as a single, positive image. Such positive images may be referred to for convenience as "integral positive-negative images", and more particularly as "integral positive-negative transparencies." Examples of film units which provide such integral positive-negative transparencies are set forth, for example, in the above-indicated U.S. Pat. Nos. 3,536,488; 3,894,871; 3,615,426; 3,615,427; 3,615,428; and 3,615,429.

U.S. Pat. No. 3,647,440, issued Mar. 7, 1972 discloses receiving layers comprising finely divided non-silver noble metal nuclei obtained by reducing a noble metal salt in the presence of a colloid or binder material with a reducing agent having a standard potential more negative than −0.30. It is the thrust of the patent that a reducing agent having a standard potential more negative than −0.30 must be used in order to obtain nuclei of a specific, usable size range. It is further illustrated that stannous chloride, which does not fall within the standard potential range, does not produce useful nuclei. The binder materials disclosed include gelatin, polyvinyl pyrrolidone, polymeric latices such as copoly (2-chloroethylmethacrylateacrylic acid), a mixture of polyvinyl alcohol and the interpolymer of n-butyl acrylate, 3-acryloyloxypropane-1-sulfonic acid, sodium salt and 2-acetoacetoxyethyl methacrylate, polyethylene latex, and colloidal silica. The amount of colloid binder employed ranges from about 5 to 500 mgs/ft$^2$ with the nuclei ranging from 1 to 200 micrograms/ft$^2$.

Copending application Ser. No. 649,201, filed Jan. 14, 1976, commonly assigned, discloses and claims a receiving element for use in an additive color photographic diffusion transfer film unit which comprises a transparent support carrying an additive color screen and a layer comprising noble metal silver-precipitating nuclei and a polymer; wherein the nuclei are present in a level of about 0.1–0.3 mgs/ft$^2$, and said polymer is present at a level of from about 0.5 to 5 times the coverage of said nuclei. Preferably, the noble metal is obtained by reduction of a noble metal salt or complex, and more preferably, the noble metal is palladium. The preferred binder polymers are gelatin and hydroxyethyl cellulose; gelatin at the low end of the nuclei-binder ratio can be employed to provide good density, neutral tone positive images in the receiving layer whereas the preferred levels of other polymers, such as hydroxyethyl cellulose are at the higher portions of the nuclei-binder range.

Copending application Ser. No. 897,943, filed concurrently herewith, commonly assigned, discloed and claims a receiving element for use in a silver diffusion transfer film unit which comprises a support carrying a layer of noble metal silver precipitating nuclei in a binder composition of hydroxyethyl cellulose and gelatin.

SUMMARY OF THE INVENTION

The present invention is directed to a receiving element for use in a silver diffusion transfer film unit and comprises a transparent support carrying a layer of noble metal silver-precipitating nuclei in a polymeric binder composition of polyvinyl alcohol and gelatin. The nuclei are present in the range of about 0.1 to 0.4 mgs/ft$^2$; the gelatin at a level of about 0.05 to 1.5 mgs/ft$^2$, and polyvinyl alcohol at a level of about 0.1 to 5 mgs/ft$^2$. An excess of polyvinyl alcohol to gelatin is employed. In a particularly preferred embodiment the support also carries an additive color screen.

DETAILED DESCRIPTION OF THE INVENTION

Copending application Ser. No. 649,201, discloses a nucleating layer with palladium nuclei and a single polymer; at a low coverage of nuclei gelatin is preferred while at a higher level of nuclei hydroxyethyl cellulose is preferred. A large number of natural and synthetic binder materials are disclosed as suitable, including polyvinyl alcohol.

A combination of polyvinyl alcohol and gelatin as the binder for the nuclei has now been found which provides superior photographic results. An excess of polyvinyl alcohol is employed compared to gelatin. This is contrary to the disclosure of copending application Ser. No. 649,201 which set a limit on the binder coverage and in fact disclosed the lower level of polymer range as the preferred level to obtain a more neutral image tone.

The novel silver-precipitating layer of the present invention provides a more stable positive image, particularly with respect to high humidity conditions, as well as an increase in film speed.

In a preferred embodiment a ratio of 4 to 1 polyvinyl alcohol to gelatin is employed. In a particularly preferred embodiment, the silver-precipitating layer comprises 0.15 mgs/ft$^2$ palladium, 0.2 mgs/ft$^2$ gelatin and 0.8 mgs/ft$^2$ of polyvinyl alcohol.

The noble metals employed in the present invention include silver, gold, palladium and platinum. However, particularly superior results are achieved at the specified coverages with palladium and, for convenience, the invention will be described primarily in terms of this preferred embodiment.

Combinations of noble metals may be used as well as single noble metals. In a preferred embodiment, noble metals salts or complexes may be reacted with reducing metal salts from aqueous salts of the noble metals. Suitable compounds include the following:

$K_2PdCl_4$
$PdCl_2$
$H_2PtCl_6$
$AgNO_3$
$HAuCl_4$

EXAMPLE 1

The following solutions were prepared:

| Solution A | |
|---|---|
| Water | 3140.4 g. |
| Glacial Acetic Acid | 3.5 g. |
| Gelatin (20% solution) | 3.6 g. |
| $SnCl_2 \cdot 2 H_2O$ | 1.7 g. |

| Solution B | |
|---|---|
| Water | 196 g. |
| Polyvinyl Alcohol (Elvanol 72-60, sold by E. I. duPont deNemours & Co. Wilmington, Delaware) | 4.0 g. |

| Solution | |
|---|---|
| Water | 1400 g. |
| $PdCl_2$ solution (80.6 g HCl, 166.6 g $PdCl_2$/l. of solution) | 28.7 g. |

Solution A was heated to 81°–82° C. and 330 g. of Solution C added with agitation. Addition was completed within 5 seconds and the solution cooled to 24° C. with continuting agitation. Water lost through evaporation was replaced. 3.3 g. of 10% alkyl phenoxypolyoxy ethanol (sold under the trade name PE 120 by NOPCO Chemical Division of Diamond Shamrock Company) was added. After mixing 5 min., 138 g. of 2-propanol as a coating aid was added. To the combination of Solutions A & C (3479 g.) was added the quantity of Solution B to give the desired PVA/gel ratios.

The utility of such nuclei layers is described below.

EXAMPLE 2

A film unit was prepared comprising a transparent polyester film base carrying on one surface, an additive color screen of approximately 1500 triplets per inch of red, blue and green filter screen elements in repetitive side-by-side relationship; 328 mgs/ft$^2$ polyvinylidine chloride polyvinyl formal protective overcoat layer; a nucleating layer comprising palladium nuclei with the coverages and polymers designated below; an interlayer formed by coating 1.9 mgs/ft$^2$ gelatin, 2.3 mgs/ft$^2$ acetic acid and 0.19 mgs/ft$^2$ octylphenoxy polyethoxy ethanol surfactant; a hardened gelatino silver iodobromo emulsion (0.59$\mu$ mean diameter grains) coated at a coverage of about 91 mgs/ft$^2$ of gelatin and about 110 mgs/ft$^2$ of silver with about 7.18 mgs/ft$^2$ propylene glycol alginate and about 0.73 mgs/ft$^2$ of nonyl phenol polyglycol ether (containing 9.5 moles of ethylene oxide) panchromatically sensitized with 5,5′-dimethyl-9-ethyl-3,3′-bis-(3 sulfopropyl) thiacarbocyanine triethyl-ammonium salt (0.53 mg/g Ag); 5,5′-diphenyl-9-ethyl-3,3′-bis-(4-sulfobutyl) oxacarbocyanine (0.75 mg/gAg); anlydro 5.6-dichloro-1,3-diethyl-3′-(4″sulfobutyl)benzimidazolo-thiacarbocyanine hydroxide (0.7 mg/gAg); and 3-(3-sulfopropyl)-3′-ethyl-4,5-benzothia-thiacyanine betaine (1.0 mg/gAg); red, green, green and blue sensitizers respectively; and the following antihalo top coat. The antihalo top coat referred to below is disclosed and claimed in copending application Ser. No. 383,261, filed July 27, 1973 commonly assigned.

| Top Coat | mgs/ft$^2$ |
|---|---|
| Gelatin | 400 |
| Dow 620 (carboxylated styrene/butadiene copolymer latex Dow Chemical Co., Midland, Michigan) | 204 |
| Propylene glycol alginate | 25.7 |
| Dioctyl ester of sodium sulfosuccinate | 1.2 |
| Benzimidazole-2-thiol gold $Au^{+1}$ complex | 5 (as gold) |
| Daxad-11 (polymerized sodium salts of alkyl naphthalene sulfonic acid) Manufactured by W. R. Grace & Co. Cambridge, MA | 0.38 |
| Pyridinium bis-1,5 (1,3-diethyl-2-thiol-5-barbituric acid) pentamethine oxanol | 5.6 |
| 4-(2-chloro-4-dimethylamino benzaldehyde)-1-(p-phenyl carboxylic acid)-3-methyl pyrazolone-5 | 7 |

| Processing Composition | Weight % |
|---|---|
| Sodium hydroxide | 9.4 |
| hydroxyethyl cellulose (sold by Hercules, Inc., Wilmington, Delaware under the tradename Natrosol 250 H) | 0.7 |
| Tetramethyl reductic acid | 9.0 |
| Potassium bromide | 0.6 |
| Sodium Sulfite | 0.8 |
| 2-methylthiomethyl-4,6-dihydroxypyrimidine | 9.0 |
| 4-aminopyrazolo-[3,4d]-pyrimidine | 0.02 |
| N-benzyl-$\alpha$-picolinium bromide (50% solution) | 2.9 |
| Water | 67.6 |

Film units prepared according to the above procedure were given a 16 mcs exposure with a Xenon sensitometer and processed with mechanical rollers with an 8 mil. gap disposing the processing composition between the top coat and a polyethylene terephthalate cover sheet. The film unit was held in the dark for 1 minute and then the cover sheet was removed, retaining the rest of the film unit together and then air drying.

TABLE 1

| | Receiving Layer Coverages (mgs/ft$^2$) | | | |
|---|---|---|---|---|
| Examples | Pd | gelatin | polyvinyl alcohol | PVA/gel ratio |
| 3 | 0.15 | 0.2 | 0.4 | 2/1 |
| 4 | 0.15 | 0.2 | 0.8 | 4/1 |
| 5 | 0.15 | 0.2 | 1.5 | 8/1 |
| 6 | 0.15 | 0.2 | 3.8 | 20/1 |

Visual examination of the projected image showed substantial elimination of the type of image degradation which was found in film units which did not employ the receiving layer of the present invention.

The following tables set forth spectral data from film units of the present invention employing receiving layer coverages as in Example 4, i.e., a 4/1 polyvinyl alcohol/gelatin ratio. In Table 2 the silver coverage in the emulsion is 150 mgs/ft$^2$ and the average mean diameter of the grains is 0.73μ. In table 3 the silver coverage in the emulsion is 110 mgs/ft$^2$ and the average mean diameter of the grains is 0.59μ. Examples 7 and 11 are controls, that is they contain no polyvinyl alcohol.

The spectral data was obtained by reading the neutral column to red, green and blue light in an automatically recording densitometer. The 0.8 green exposure (speed) represents the wedge density that gives a green density of 0.8 plus $D_{min}$ and is a measure of speed.

The source of the different polyvinyl alcohols is set forth below.

| | | | |
|---|---|---|---|
| A | Elvanol | 72-60 | E. I. duPont de Nemours, & Co. Wilmington, Delaware |
| B | Gelvatol | 1-90 | Monsanto Chemical Company St. Louis, Missouri |
| C | Vinol | 350 | Air Products and Chemicals, Inc. Wayne, Indiana |

TABLE 2

| | $D_{max}/D_{min}$ | | | 0.8 Green Exposure | Type of |
|---|---|---|---|---|---|
| Example | Red | Green | Blue | (Speed) | PVA |
| 7 | 1.98/0.53 | 2.04/0.53 | 2.01/0.51 | 1.99 | — |
| 8 | 1.78/0.53 | 1.81/0.48 | 1.79/0.49 | 2.21 | A |
| 9 | 1.98/0.53 | 2.03/0.52 | 1.99/0.52 | 2.15 | B |
| 10 | 1.95/0.50 | 1.95/0.42 | 1.95/0.48 | 2.19 | C |

TABLE 3

| | $D_{max}/D_{min}$ | | | 0.8 Green Exposure | Type of |
|---|---|---|---|---|---|
| Example | Red | Green | Blue | (Speed) | PVA |
| 11 | 3.26/0.45 | 3.23/0.45 | 3.01/0.42 | 1.77 | — |
| 12 | 3.05/0.39 | 3.09/0.42 | 3.00/0.41 | 1.82 | A |
| 13 | 3.15/0.40 | 3.15/0.39 | 3.08/0.39 | 1.84 | B |
| 14 | 3.08/0.43 | 3.13/0.45 | 3.02/0.42 | 1.85 | C |

From the above it can be seen that significantly increased film speed is obtained with the novel silver-precipitating layers of the present invention.

While the invention is described primarily in terms of an additive color system, it should also be understood that the novel image-receiving elements of the present invention are suitable for use in black and white silver diffusion transfer systems.

The support employed in the present invention is not critical. The support or film base employed may comprise any of the various types of transparent rigid or flexible supports, for example, glass, polymeric films of both the synthetic type and those derived from naturally occurring products, etc. Especially suitable materials, however, comprise flexible transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid, polymer cellulose derivates such as cellulose acetate, triacetate, nitrate, propionate, butrate, acetate-butrate; or acetate propionate; polycarbonates; polystyrenes; and the like.

The additive color screen employed in the present invention may be formed by techniques well known in the art, e.g., by sequentially printing the requisite filter patterns by photomechanical methods. An additive color screen comprises an array of sets of colored areas or filter elements, usually from two to four different colors, each of said sets of colored areas being capable of transmitting visible light within one of the so-called primary wavelengths ranges, i.e., red, green and blue. The additive color screen may be composed of minute dyed particles, such as starch grains or hardened gelatin particles, intermixed and interspersed in a regular or random arrangement to provide a mosaic. A regular mosaic of this type may be made by the alternating embossing and doctoring technique described in U.S. Pat. No. 3,019,124. Another method of forming a suitable color screen comprises multi-line extrusion of the type disclosed in U.S. Pat. No. 3,032,008, the colored lines being deposited side-by-side in a single coating operation. Still another method is set forth in U.S. Pat. No. 3,284,208. Silver halide solvents usefl in forming the desired soluble complex with unexposed silver are well known and, for example, may be selected from the alkali metal thiosulfates, particularly sodium or potassium thiosulfates, or the silver halide solvent may be cyclic imide, such as uracil, in combination with a nitrogenous base as taught in U.S. Pat. No. 2,857,274 issued Oct. 21, 1958, to Edwin H. Land; or pseudouracils, such as the 4,6-dihydroxypyrimidines. While the silver halide solvent is preferably initially present in the processing composition, it is within this invention to initially position the silver halide solvent in a layer of the film unit, preferably in the form of a precursor which releases or generates the silver halide solvent upon contact with an alkaline processing fluid.

The processing composition may contain a thickening agent, such as an alkali metal carboxymethyl cellulose or hydroxyethyl cellulose, in a quantity and viscosity grade adapted to facilitate application of the processing composition. The processing composition may be left on the processed film or removed, in accordance with known techniques, as is most appropriate for the particular film use. The requisite alkalinity, e.g., a pH of 12-14, is preferably imparted to the processing composition, such as sodium, potassium and/or lithium hydroxide. A wetting agent may be advantageously included in the processing composition to facilitate application thereof, particularly where the processing composition is applied in a very thin layer of low viscosity fluid.

Suitably silver halide developing agents may be selected from amongst those known in the art, and may be initially positioned in a layer of the photosensitive element and/or in the processing composition. Organic silver halide developing agents are generally used, e.g., organic compounds of the benzene or naphthalene series containing hydroxyl and/or amino groups in the para- or ortho-positions with respect to each other, such as hydroquinone, tert-butyl hydroquinone, toluhydroquinone, p-aminophenol, 2,6-dimethyl-4-aminophenol, 2,4,6-triaminophenol, etc. If the additive color transparency is one which is not washed after processing to remove unused silver halide developing agent, development reaction products, etc., the silver halide developing agent(s) should not give rise to colored reaction products which might stain the image or which, either unreacted or reacted, might adversely affect the stability and sensitometric properties of the final image. Particularly useful silver halide developing agents having good stability in alkaline solution are substituted reductic acids, particularly tetramethyl reductic acid, as disclosed in U.S. Pat. No. 3,615,440 issued Oct. 26, 1971 to Stanley M. Bloom and Richard D. Cramer, and $\alpha,\beta$-enediols as disclosed in U.S. Pat. No. 3,730,716 issued to Edwin H. Land, Stanley M. Bloom and Leonard C. Farney on May 1, 1973.

What is claimed is:

1. An image receiving element for use in a photographic silver diffusion transfer process which comprises a transparent support carrying a layer comprising noble metal silver-precipitating nuclei, gelatin and polyvinyl alcohol; wherein said nuclei are present in a level of about 0.1–0.4 mgs/ft$^2$ said gelatin at a level of about 0.05 to 1.5 mgs/ft$^2$ and said polyvinyl alcohol at a level of about 0.1 to 5 mgs/ft$^2$ and said polyvinyl alcohol is present in an excess over said gelatin.

2. The element of claim 1 wherein said noble metal is palladium.

3. The element of claim 2 wherein said palladium is obtained by the reduction of a salt or complex.

4. The element as defined in claim 3 wherein said palladium is present at a level of 0.15 mgs/ft$^2$; said gelatin at a level of about 0.2 mgs/ft$^2$ and said polyvinyl alcohol at a level of about 0.8 mgs/ft$^2$.

5. The element as defined in claim 1 which includes an additive color screen.

6. An image receiving element for use in an additive color photographic diffusion transfer process which comprises a transparent support carrying an additive color screen and a layer comprising palladium metal silver-precipitating nuclei, gelatin and polyvinyl alcohol wherein said nuclei are present at a level of about 0.15 mgs/ft$^2$; said gelatin is present at a level of about 0.2 mgs/ft$^2$ and said polyvinyl alcohol is present at a level of about 0.8 mgs/ft$^2$ and said palladium nuclei are formed by the reduction of palladous chloride with stannous chloride.

7. A silver diffusion transfer film unit which comprises a transparent support carrying, in order, a layer comprising noble metal silver-precipitating nuclei, gelatin and polyvinyl alcohol, wherein said nuclei are present in a level of about 0.1 to 0.4 mgs/ft$^2$; said gelatin at a level of about 0.05 to 1.5 mgs/ft$^2$ and said polyvinyl alcohol at a level of about 0.1 to 5 mgs/ft$^2$; a photosensitive silver halide layer; and an antihalation layer; wherein said polyvinyl alcohol is present in an excess over said gelatin.

8. The film unit of claim 7 wherein said noble metal is palladium.

9. The film unit of claim 8 wherein said palladium is obtained by the reduction of a salt or complex.

10. The film unit of claim 7 wherein said silver halide emulsion is a panchromatically sensitized silver iodobromide emulsion.

11. The film unit of claim 7 which includes an additive color screen.

12. An additive color diffusion transfer film unit which comprises a transparent support carrying, in order, an additive color screen, a layer comprising palladium metal silver-precipitating nuclei, gelatin and polyvinyl alcohol wherein said nuclei are present at a level of about 0.15 mgs/ft$^2$; said gelatin is present at a level of about 0.2 mgs/ft$^2$; and said polyvinyl alcohol is present at a level of about 0.8 mgs/ft$^2$ and said palladium nuclei are formed by the reduction of palladous chloride with stannous chloride; a photosensitive silver halide emulsion layer; and an antihalation layer.

* * * * *